United States Patent
Matsui (10) Patent No.: US 10,650,292 B2
(45) Date of Patent: May 12, 2020

(54) PRINTING APPARATUS AND METHOD OF CONTROLLING PRINTING APPARATUS

(71) Applicant: CANON KABUSHIKI KAISHA, Tokyo (JP)

(72) Inventor: Kenta Matsui, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/449,773

(22) Filed: Mar. 3, 2017

(65) Prior Publication Data
US 2017/0262740 A1    Sep. 14, 2017

(30) Foreign Application Priority Data

Mar. 8, 2016   (JP) .................................. 2016-044985

(51) Int. Cl.
*G06F 15/00*   (2006.01)
*G06K 15/02*   (2006.01)

(52) U.S. Cl.
CPC ..... *G06K 15/1822* (2013.01); *G06K 15/1813* (2013.01); *G06K 15/1821* (2013.01); *G06K 15/1838* (2013.01); *G06K 15/1856* (2013.01)

(58) Field of Classification Search
CPC ........... G06K 15/1822; G06K 15/1813; G06K 15/1821; G06K 15/1838
USPC ...................................................... 358/1.15
See application file for complete search history.

(56) References Cited

U.S. PATENT DOCUMENTS

| | | | | |
|---|---|---|---|---|
| 2012/0013925 | A1* | 1/2012 | Miyazaki .............. | G06F 3/1213 358/1.13 |
| 2013/0010316 | A1* | 1/2013 | Tokuda ................. | G06F 3/1285 358/1.13 |
| 2013/0188208 | A1* | 7/2013 | Yokoyama ................ | G06F 3/12 358/1.13 |
| 2016/0094727 | A1* | 3/2016 | Sawada ................ | H04N 1/3935 358/1.15 |

FOREIGN PATENT DOCUMENTS

JP     2006-076220 A     3/2006
JP     2009-234241 A    10/2009

* cited by examiner

*Primary Examiner* — Mark R Milia
(74) *Attorney, Agent, or Firm* — Canon U.S.A., Inc. IP Division (57) ABSTRACT

A printing apparatus configured to receive print data, analyze the print data, and print the print data includes a control unit configured to control activation of a plurality of analysis units respectively supporting different data formats, a reception unit configured to receive from an external apparatus a predetermined inquiry received before receiving print data from the external apparatus, and a notification unit configured to notify the external apparatus of a response to the predetermined inquiry, the response including at least information indicating a predetermined data format supported by the printing apparatus, wherein, based on the predetermined inquiry, the control unit activates one of the analysis units that supports the predetermined data format indicated by the information.

18 Claims, 4 Drawing Sheets

PRINTING APPARATUS AND METHOD OF CONTROLLING PRINTING APPARATUS

BACKGROUND OF THE INVENTION

Field of the Invention

The present invention relates to a technique for analyzing page description language (PDL) data.

Description of the Related Art

A printing apparatus receives page description language (hereinafter, "PDL") print data (hereinafter, referred to as "PDL data") from a computer such as a host personal computer (PC). Then, the printing apparatus analyzes the print data to generate a bitmap of a page and performs printing based on the bitmap. In the print data analysis, an analysis module corresponding to the type of PDL describing the print data is used.

A recent printing apparatus is capable of receiving print data not only from a PC but also from a mobile terminal, and performing printing based on the received print data. In this case, the mobile terminal transmits to the printing apparatus an inquiry about capability of the printing apparatus before transmitting the print data to the printing apparatus. In response to the inquiry, the printing apparatus transmits capability information, such as information about the types of PDLs supported by the printing apparatus, to the mobile terminal. Then, the mobile terminal generates print data and transmits the generated print data to the printing apparatus.

Japanese Patent Application Laid-Open No. 2009-234241 discusses a printing apparatus which analyzes received print data and prints the print data. When receiving the print data, the printing apparatus downloads from an external device an analysis module that supports the format of the print data, and activates the downloaded analysis module. Then, the received print data is analyzed by the activated analysis module and printed. The printing apparatus discussed in Japanese Patent Application Laid-Open No. 2009-234241 activates a necessary analysis module only when needed to realize a memory-saving configuration.

The conventional printing apparatus realizes the memory-saving configuration, but since the printing apparatus needs to wait for the reception of print data to identify the analysis module that is to be activated, activation of the analysis module is delayed by the waiting time.

SUMMARY OF THE INVENTION

The present invention is directed to a printing apparatus capable of activating an analysis module before receiving print data while realizing a memory-saving configuration by taking advantage of the point that an inquiry from an external apparatus is transmitted before the reception of the print data.

According to an aspect of the present invention, a printing apparatus configured to receive print data, analyze the print data, and print the print data includes a control unit configured to control activation of a plurality of analysis units respectively supporting different data formats, a reception unit configured to receive from an external apparatus a predetermined inquiry received before receiving print data from the external apparatus, and a notification unit configured to notify the external apparatus of a response to the predetermined inquiry, the response including at least information indicating a predetermined data format supported by the printing apparatus, wherein, based on the predetermined inquiry, the control unit activates one of the analysis units that supports the predetermined data format indicated by the information.

Further features of the present invention will become apparent from the following description of exemplary embodiments with reference to the attached drawings.

DESCRIPTION OF THE EMBODIMENTS

An exemplary embodiment of the present invention will be described below with reference to the drawings.

Figure 1:
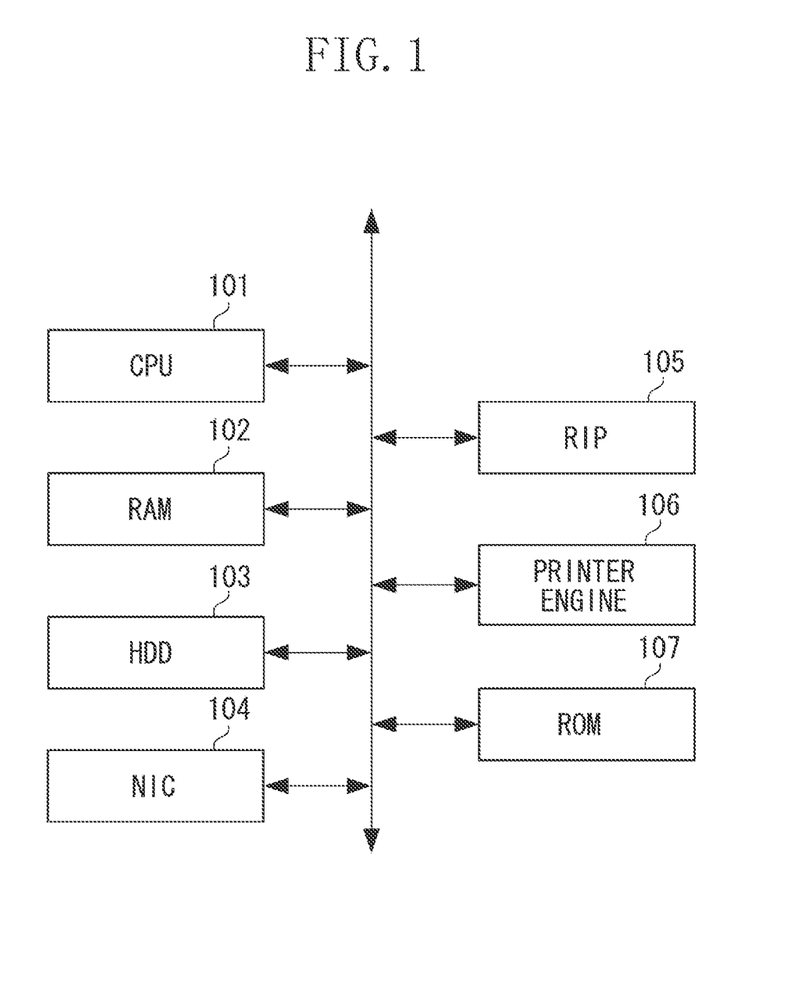
FIG. 1 illustrates an example of a hardware configuration of a printing apparatus according to a first exemplary embodiment.

FIG. 1 illustrates a hardware configuration of a printing apparatus according to an exemplary embodiment of the present invention. The printing apparatus includes a central processing unit (CPU) 101, a random access memory (RAM) 102, a hard disk drive (HDD) 103, a network interface controller (NIC) 104, a raster image processor (RIP) 105, a printer engine 106, and a read-only memory (ROM) 107.

The CPU 101 loads programs stored in the ROM 107 onto the RAM 102 and executes the programs to operate software modules described below with reference to FIG. 2. For example, an analysis module is operated by the CPU 101. Further, the RAM 102 functions as a work memory to be used during execution of the programs.

The HDD 103 is used as a storage destination (spool area) of a bitmap image generated by a renderer.

The NIC 104 is an interface which receives an inquiry (request) about capability information and print data from an external apparatus, such as a mobile terminal and a host personal computer (PC) (hereinafter, "PC").

The RIP 105 is an application-specific integrated circuit (ASIC) which generates a bitmap image from a result of print data analysis performed by the analysis module operated by the CPU 101.

The printer engine 106 prints an image on a print sheet based on the bitmap image generated by the RIP 105.

Figure 2:
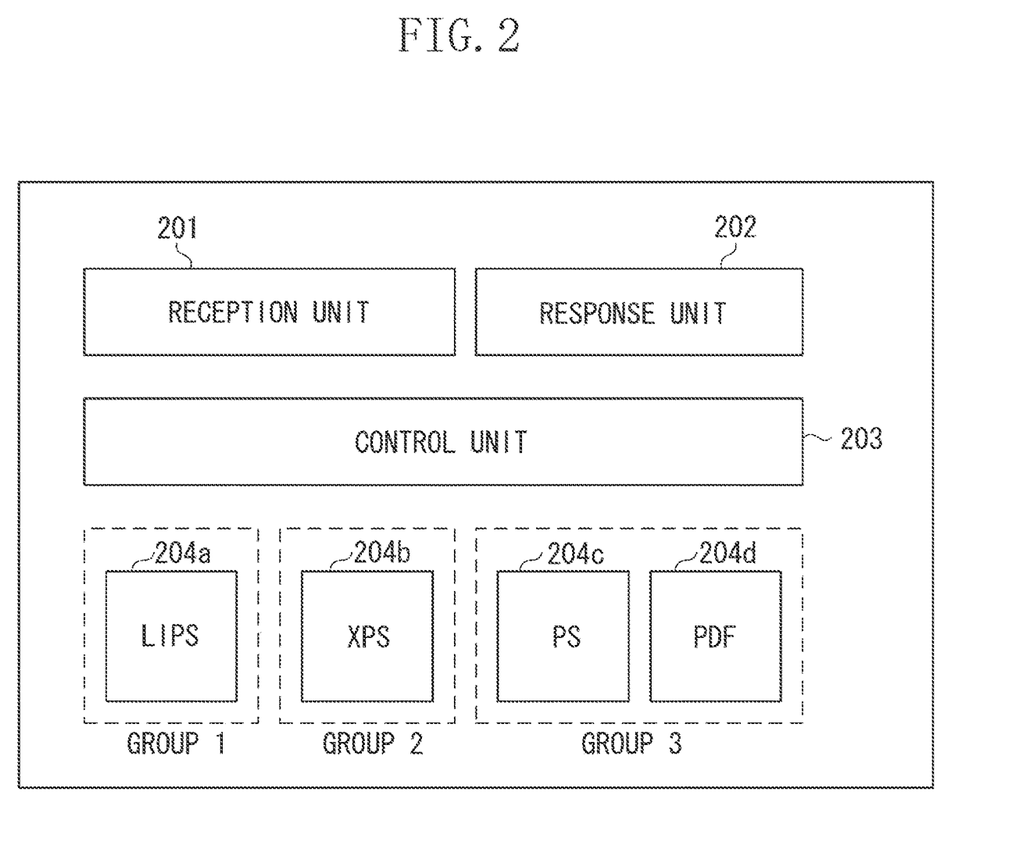
FIG. 2 illustrates an example of a software functional configuration of the printing apparatus according to the first exemplary embodiment.

FIG. 2 illustrates a software module configuration according to the present exemplary embodiment. The software modules are stored in the ROM 107 and are operated when executed by the CPU 101.

A reception unit 201 is a module which receives from an external apparatus, such as a PC and a mobile terminal, print data transmitted according to a communication protocol, such as a standard Transmission Control Protocol/Internet Protocol (TCP/IP) port monitor, Line Printer Daemon Protocol (LPR), or Internet Printing Protocol (IPP).

A response unit 202 is a module which receives a printing apparatus capability inquiry transmitted from an external apparatus, such as a mobile terminal, and transmits to the mobile terminal a print data format (page description language (PDL) type) that is preferred and supported by the printing apparatus, in response to the inquiry. The preferred data format will be referred to as a preferred format.

A PC or the like sometimes transmits print data in an original data format (e.g., Laser Beam Printer (LBP) Image Processing System (LIPS)) of a vendor of the printing apparatus using a printer driver. On the other hand, a mobile terminal or the like is not likely to include a printer driver and usually transmits print data in a standard data format (e.g., Portable Document Format (PDF)) different from the original data format. Further, the mobile terminal or the like transmits the inquiry before transmitting the print data. Thus, when receiving the inquiry, the response unit 202 determines that the inquiry is an inquiry transmitted from the mobile terminal or the like, and transmits, in response to the inquiry, a response indicating the standard data format, which is expected to be supported by the mobile terminal, as a preferred format.

Analysis modules 204a, 204b, 204c, and 204d are four types of analysis modules for analyzing print data. For example, the analysis modules are distinguished according to an analyzable PDL type. In the present exemplary embodiment, the analysis modules for analyzing four PDL types are prepared. The four PDL types are LIPS, Extensible Markup Language (XML) Paper Specification (XPS), PostScript (PS), and PDF.

A control unit 203 classifies a plurality of analysis modules into groups to control activation and termination of the analysis modules on a group-unit basis. Activation of an analysis module by the control unit 203 refers to execution of a program of the analysis module by the CPU 101 functioning as the control unit 203. Further, initiation of activation of an analysis module also refers to the activation of the analysis module. Termination of an analysis module by the control unit 203 refers to termination of execution of a program of the analysis module by the CPU 101 functioning as the control unit 203. When activation of an analysis module is completed, a necessary amount of memory of the RAM 102 is consumed (allocated). When the analysis module is terminated, the allocated memory is released. In the present exemplary embodiment, the control unit 203 classifies the LIPS analysis module 204a into a group 1, the XPS analysis module 204b into a group 2, and the PS analysis module 204c and the PDF analysis module 204d into a group 3. The control unit 203 according to the present exemplary embodiment performs control such that when the activation of an analysis module of a group is not terminated and is maintained, an analysis module of another group is not activated. Specifically, the control unit 203 controls activation and termination of the analysis modules on the group-unit basis so as to avoid a situation in which all the analysis modules included in the printing apparatus are activated. The control in this way reduces the amount of memory of the RAM 102 prepared for activation of the analysis modules. For example, when 60 MB, 130 MB, and 130 MB of memory are needed to activate the analysis modules of the groups 1, 2, and 3, respectively, 320 (=60+130+130) MB of memory is needed to activate the analysis modules of all the groups. However, if the analysis module(s) of one of the plurality of groups is to be activated as in the present exemplary embodiment, the minimum amount of required memory is reduced to 130 MB. The grouping method is not limited to the above-described method.

Further, the control unit 203 controls termination and activation of the analysis modules based on the prediction that the mobile terminal transmits print data in the standard data format after transmitting an inquiry. Specifically, upon receiving the inquiry, the control unit 203 terminates an activated analysis module without waiting for reception of print data, and initiates activation of an analysis module that supports a preferred format and is not activated yet. As to the timing of performing the control of termination and activation of the analysis modules, a trigger can be the reception of the inquiry or the above-described response by the response unit 202. Further, the control of termination and activation of the analysis modules can be performed before or after the response by the response unit 202 or can be performed concurrently with the response. For example, if the response by the response unit 202 and the control of the analysis modules by the control unit 203 are performed concurrently upon reception of the inquiry, a delay in the timing of execution of processing by the mobile terminal according to the content of the response is prevented without a delay in the timing of the response. As described above, the printing apparatus according to the present exemplary embodiment performs the control of activation of the analysis modules using the inquiry as a trigger to realize a memory-saving configuration and expedite initiation of analysis of print data.

The control unit 203 activates on the group-unit basis the analysis module that is necessary for analyzing the print data, and causes the activated analysis module to analyze the print data. Then, the control unit 203 transmits the analysis result to the RIP 105, and the RIP 105 generates a bitmap image.

Figure 4:
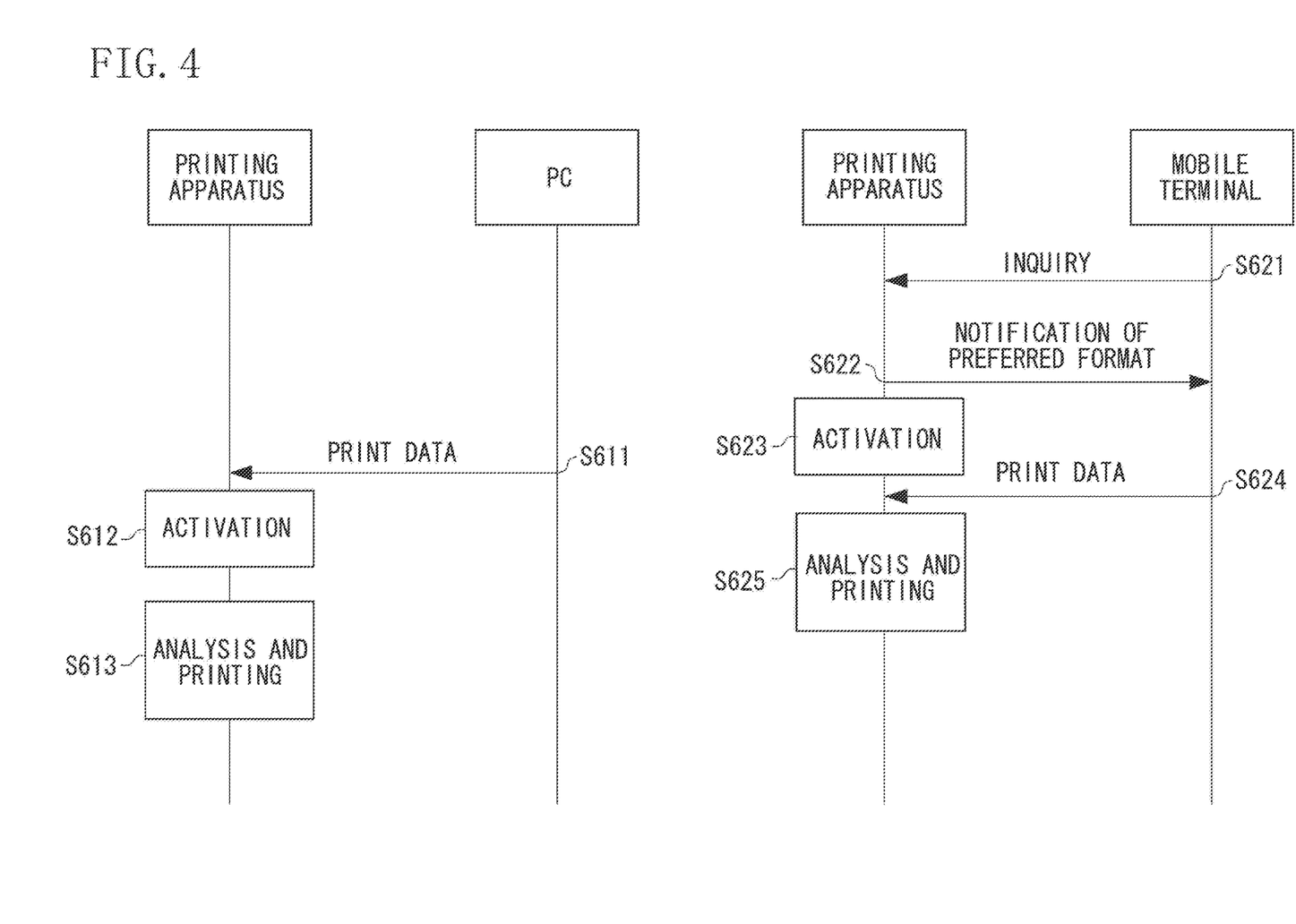
FIG. 4 illustrates an outline of a printing procedure in each of a host personal computer (PC) and a mobile terminal.

The following describes a process in which the printing apparatus receives print data from an external apparatus and prints the received print data, with reference to FIG. 4 using a PC and a mobile terminal as an example.

In the case of the PC, since a dedicated printer driver for the printing apparatus is preinstalled on the PC, the PC already has information about the capability and an Internet Protocol (IP) address of the printing apparatus. In step S611, at a timing when a user gives a print instruction, the PC transmits print data to the printing apparatus having the IP address according to a communication protocol such as the standard TCP/IP port monitor or LPR. The printing apparatus receives the print data, and analyzes header information about the received print data and first several bytes of the received print data to identify the PDL type of the print data. Then, in step S612, the printing apparatus activates the analysis module corresponding to the identified PDL type. In step S613, the print data is analyzed by the activated analysis module and printed.

In the case of the mobile terminal, in general, the dedicated printer driver for the printing apparatus is less likely to be installed on the mobile terminal. Therefore, the mobile terminal has neither information about the capability nor an IP address of the printing apparatus. Thus, the mobile terminal first searches for a printing apparatus that is connected to a network such as a local area network (LAN) and is capable of performing printing according to the Internet Printing Protocol (IPP). Next, the mobile terminal displays on a screen of the mobile terminal a list of one or more searched printing apparatuses, and prompts the user to select one of the searched printing apparatuses. Then, in step S621, at a timing when the user's selection is received, the mobile terminal transmits to the printing apparatus selected by the user an inquiry about the capability of the printing apparatus according to IPP. According to IPP, the inquiry is transmitted to the printing apparatus as a Get-Printer-Attributes request from the mobile terminal.

In step S622, in response to the inquiry, the printing apparatus transmits capability information about the printing apparatus according to IPP. For example, the printing apparatus transmits a response with information including document-format-supported attribute information specifying a PDL type supported by the printing apparatus (PDL type for which the printing apparatus includes an analysis module) as a supported format. The supported format can include at least one PDL type. Further, the printing apparatus transmits the response with information including document-format-preferred attribute information specifying one of the supported formats as a preferred format. Furthermore, the printing apparatus transmits the response with other attribute information, such as information about whether the printing apparatus is a full-color printer. Then, in step S623, upon receiving the inquiry, the printing apparatus activates the analysis module of the PDL type specified in the response as the preferred format, concurrently with the transmission of the response.

The mobile terminal having received the response including the capability information from the printing apparatus displays on the screen of the mobile terminal print setting candidates settable in the printing apparatus based on the capability information, and prompts the user to set a print setting. Then, in step S624, at a timing when the user having set the print setting presses a print button displayed on the screen of the mobile terminal, the mobile terminal generates print data in preferred format and transmits the generated print data to the printing apparatus according to IPP.

Then, in step S625, the printing apparatus analyzes header information about the received print data and first several bytes of the received print data, and determines whether the PDL type of the print data is analyzable by the activated analysis module. If the PDL type is analyzable, the printing apparatus analyzes the print data using the analysis module activated before the reception of the print data and prints the print data.

The activation of the analysis module prior to the reception of print data as described above enables initiation of the analysis processing promptly after the reception of the print data. On the other hand, if the PDL type is not analyzable, the printing apparatus terminates the activated analysis module that activation processing has been completed, activates the analysis module of the PDL type of the print data, and analyzes the print data using the activated analysis module to print the print data.

Figure 3:
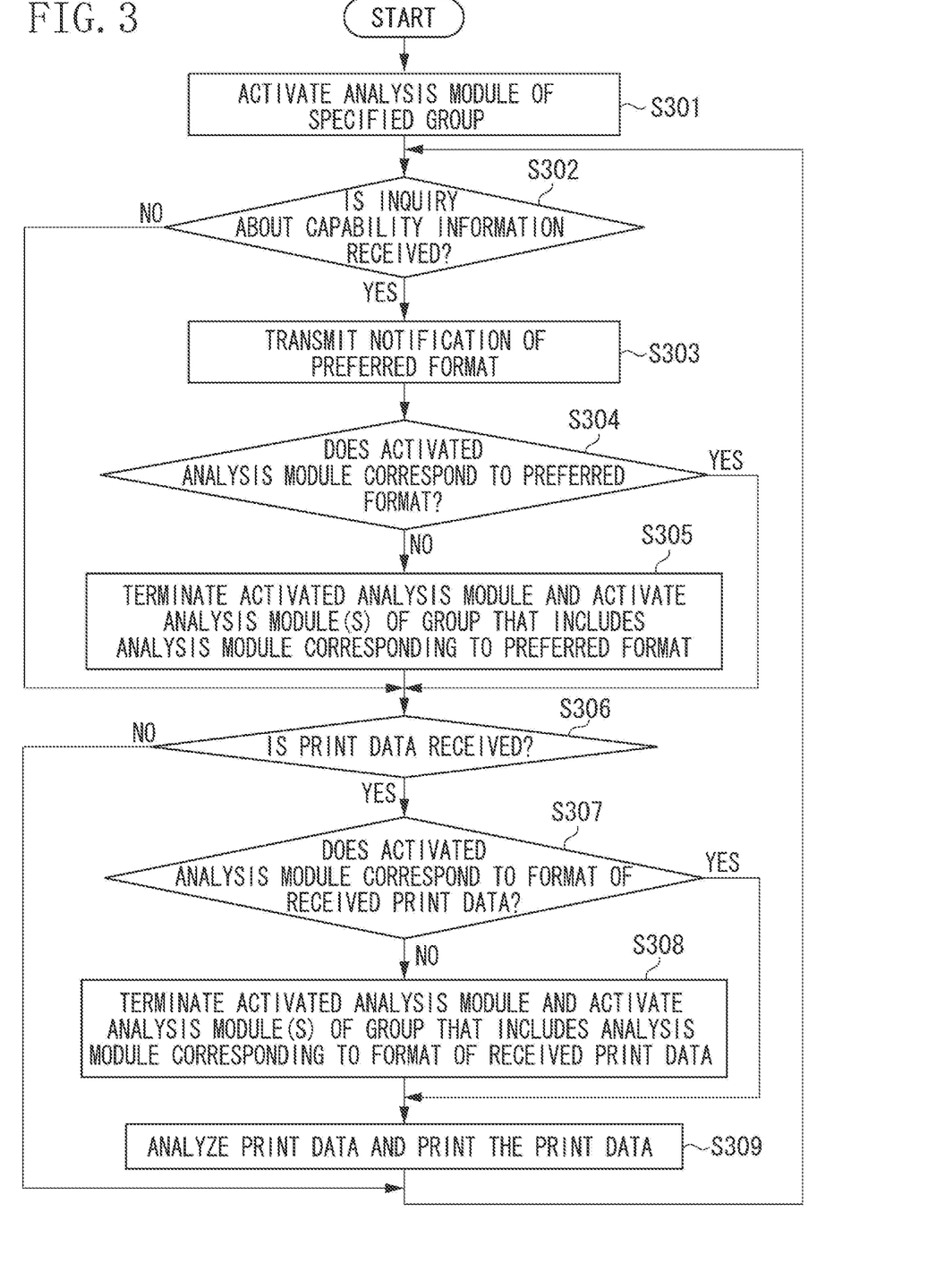
FIG. 3 is a flowchart illustrating a process according to the first exemplary embodiment.

FIG. 3 is a flowchart illustrating a process which is performed by the printing apparatus to analyze print data received from an external apparatus. For example, when the power of the printing apparatus is turned on, the CPU 101 loads a program stored in the ROM 107 into the RAM 102 and executes the program to operate the modules illustrated in FIG. 2. Then, the modules operate in cooperation to execute the process illustrated in the flowchart. The process illustrated in the flowchart is characterized by receiving a predetermined inquiry from an external apparatus and upon receiving the inquiry, notifying the external apparatus of a preferred format in response and controlling activation (termination and initiation of activation) of the analysis modules. The process is characterized especially in that the analysis module supporting the preferred format is activated upon the reception of the inquiry.

In step S301, the control unit 203 activates the analysis module of a specified group. In the present exemplary embodiment, the group 1 is predetermined as the specified group, so the LIPS analysis module 204a is activated. The XPS analysis module 204b of the group 2 and the PS analysis module 204c and the PDF analysis module 204d of the group 3 are not activated.

In step S302, the response unit 202 determines whether an inquiry about capability (capability information) of the printing apparatus according to a predetermined protocol is received. Specifically, the response unit 202 determines whether the data received from the external apparatus is the inquiry. This determination includes two types of determination. The first one is the determination of whether the received data is data according to the predetermined protocol. The second one is the determination of whether the received data is the inquiry about the capability information. Step S302 corresponds to step S621 in FIG. 4. The inquiry is assumed to be an inquiry from the mobile terminal. Thus, in the present exemplary embodiment, the predetermined protocol is assumed to be IPP, which is commonly used in transmission of print data from mobile terminals. However, the predetermined protocol can be any other communication protocols that are used in transmission of the inquiry (e.g., inquiry about capability information) from the external apparatus to the printing apparatus prior to transmission of print data. If the inquiry is received (YES in step S302), the processing proceeds to step S303. On the other hand, if no inquiry is received (NO in step S302), the processing proceeds to step S306.

In step S303, in response to the received inquiry, the response unit 202 transmits a response (notification) specifying a preferred format of print data to the mobile terminal according to the predetermined protocol. This processing corresponds to step S622 in FIG. 4. The mobile terminal notified of the preferred format basically transmits print data in the preferred format to the printing apparatus. From this point of view, the inquiry in step S302 can also be considered as an inquiry from the mobile terminal about a format in which print data should be transmitted.

In the present exemplary embodiment, the response unit 202 transmits a response specifying PDF as the preferred format to the mobile terminal, because PDF is commonly used as a format of print data that can be transmitted by mobile terminals. There may be a case in which the mobile terminal transmits print data in a format different from the preferred format (e.g., PDF), so step S307 described below is included to prepare for such a case.

In step S304, upon the reception of the inquiry, the control unit 203 determines whether the activated analysis module corresponds to the preferred format. The processing proceeds to step S305 or S306 according to the determination result. The phrase "the activated analysis module corresponds to the preferred format" refers to "the activated analysis module supports the preferred format" or "the activated analysis module is suitable for analyzing print data in the preferred format". The activated analysis module can include not only the activated analysis module that activation processing is completed, but also the analysis module that activation processing is initiated but not completed. For example, in a case where the activated analysis module is the LIPS analysis module 204a and the preferred format is PDF, the control unit 203 determines that the activated analysis module does not correspond to the preferred format. On the other hand, if the activated analysis module(s) includes the PDF analysis module 204d, the control unit 203 determines that the activated analysis module corresponds to the preferred format. Specifically, in step S304, the control unit 203 determines whether the analysis module of the activated group can analyze print data in the preferred format. If the activated analysis module does not correspond to the preferred format (NO in step S304), the processing proceeds to step S305. On the other hand, if the activated analysis module corresponds to the preferred format (YES in step S304), the processing proceeds to step S306.

In step S305, the control unit 203 terminates the activated analysis module on the group-unit basis, and activates on the group-unit basis the analysis module that can analyze print data in the preferred format. This processing corresponds to step S623 in FIG. 4. The control unit 203 terminates the activated analysis module of the group 1 (i.e., the LIPS analysis module 204a). Then, next, the control unit 203 initiates activation of the analysis modules (i.e. the PS analysis module 204c and the PDF analysis module 204d) of the group 3, which includes the analysis module (i.e., the PDF analysis module 204d) corresponding to the preferred format, and completes the activation. Then, the processing proceeds to step S306.

In step S306, the reception unit 201 determines whether print data is received from the external apparatus. This processing corresponds to steps S611 and S624 in FIG. 4. If print data is received (YES in step S306), the processing proceeds to step S307. On the other hand, if no print data is received (NO in step S306), the processing returns to step S302.

In step S307, the control unit 203 determines whether the activated analysis module corresponds to the format of the received print data. The processing proceeds to step S305 or S306 according to the determination result. For example, in a case where the activated analysis module is the LIPS analysis module 204a and the format of the print data is LIPS, the control unit 203 determines that the activated analysis module does not correspond to the format of the print data. On the other hand, in a case where the activated analysis module(s) includes the PDF analysis module 204d and the format of the print data is PDF, the control unit 203 determines that the activated analysis module corresponds to the format of the print data. Specifically, in step S307, the control unit 203 determines whether the analysis module of the activated group can analyze the received print data. If the activated analysis module does not correspond to the format of the print data (NO in step S307), the processing proceeds to step S308. On the other hand, if the activated analysis module corresponds to the format of the print data (YES in step S307), the processing proceeds to step S309. Step S307 is provided so that even if the analysis module activated in step S305 does not correspond to the format of the received print data, the analysis module that is suitable for the received print data can be activated. Further, step S307 is provided to prepare for a case where print data in a format different from the preferred format is received from the PC or the like during a period between the activation of the analysis module corresponding to the preferred format upon the reception of the inquiry from the mobile terminal and the reception of print data from the mobile terminal. This will be described below.

In step S308, the control unit 203 terminates the analysis module of the activated group, and activates a group including the analysis module that can analyze the print data received by the reception unit 201. This processing corresponds to step S612 in FIG. 4.

For example, in the case where the response unit 202 notifies the mobile terminal of PDF as the preferred format in step S303, the group 3 including the PDF analysis module 204d is activated at the time point of step S306. However, the mobile terminal does not transmit print data unless a user gives a print instruction. During this state, if the reception unit 201 receives LIPS print data transmitted from the PC, the control unit 203 terminates the group 3 (the PS analysis module 204c and the PDF analysis module 204d) being activated. Then, the control unit 203 activates the group 1 (the LIPS analysis module 204a). In this way, the received print data is analyzed by the analysis module that is suitable for the print data.

If there is no analysis module that can analyze the print data (if the printing apparatus does not include the analysis module that can analyze the print data), a display unit (not illustrated) of the printing apparatus displays an error (not analyzable, not printable), and the processing of the received print data is cancelled. Since the PC basically uses the printer driver, the printing apparatus includes the analysis module that can analyze print data transmitted from the PC, but there may be case where the mobile terminal transmits print data in a format different from the preferred format. In this case, if the printing apparatus does not include the analysis module, the printing apparatus can notify an error (not analyzable, not printable) also to the mobile terminal having transmitted the print data. When receiving the notification, the mobile terminal can display the error on a display unit of the mobile terminal.

In step S309, the control unit 203 causes the activated analysis module to analyze the print data and causes the RIP 105 to process the analysis result. Then, the control unit 203 causes the printer engine 106 to print a bitmap image generated by the RIP 105. This processing corresponds to steps S613 and S625 in FIG. 4.

Details of the process illustrated in the flowchart in FIG. 3 are as described above.

The processing of switching the analysis module in which the control unit 203 terminates the activated analysis module and activates another analysis module requires about one to two seconds. Thus, if the processing of switching the analysis module is performed prior to the reception of print data, the timing of initiation of the analysis of the print data is expedited. On the mobile terminal having received the response to the inquiry in step S302, the user presses the print button to transmit print data to the printing apparatus after performing operations to select a document to be printed (a printing target), select print settings, etc. In general, the user operations require at least two seconds. Thus, in the process illustrated in the flowchart, upon receiving the inquiry from the mobile terminal in step S302, the printing apparatus transmits a response to notify the mobile terminal of the preferred format and initiates activation of the analysis module corresponding to the preferred format prior to reception of print data. In this way, if the activation of the identified analysis module is completed during the period from the user operations on the mobile terminal to the press of the print button, the printing apparatus can analyze the print data immediately after receiving the print data. Further, even if the activation is not completed, the analysis of the print data can be initiated at least earlier than the case where the activation of the analysis module is initiated after the reception of the print data. Consequently, initiation of printing is also expedited.

In the above-described exemplary embodiment, steps S302, S303, (S304), and S305 are performed in this order, i.e., reception of an inquiry, transmission of a response to the inquiry, and activation of an analysis module. In this case, the timing of the initiation of activation of the analysis module can be the timing of the reception of the inquiry or the timing of the response to the inquiry. Further, instead of the order described above, steps S302, (S304), S305, and S303 can be performed in this order, i.e., reception of an inquiry, activation of an analysis module, and transmission of a response to the inquiry. In this case, the timing of the initiation of activation of the analysis module can be the timing of the reception of the inquiry. In the above-described exemplary embodiment, the printing apparatus initiates an activation of the analysis module based on the inquiry about capability. However, the printing apparatus may initiate the activation of the analysis module based on another inquiry, request or operation from the mobile terminal, which is different from the inquiry about capability. In printing process according to IPP, the mobile terminal sends, to the printing apparatus, a request (Validate-Job) for validating print data (print job) received from the mobile terminal, a request (Create-Job) for creating a job of print data, and an operation (Send-Document) for sending the print data, after the printing apparatus receives the inquiry about capability and before the printing apparatus receives the print data. As other exemplary embodiments, the printing apparatus may initiate the activation of the analysis module based on one of these requests and operations received from the mobile terminal.

In the above-described exemplary embodiment, whether an inquiry about capability (capability information) of the printing apparatus is received according to the predetermined communication protocol (e.g., IPP) is determined in step S302, and the analysis unit that supports the preferred format is activated upon the inquiry. Alternatively, the following configuration can be employed. In a case where print data is to be received according to the predetermined communication protocol, activation of the analysis unit that supports the preferred format can be initiated upon initiation of communication according to the communication protocol.

In the present exemplary embodiment, the activated analysis module is not switched after printing of the print data. Specifically, in a case where the analysis modules 204c and 204d of the group 3 are activated upon the inquiry about capability information and PDF print data is received from the mobile terminal and printed, the printing apparatus continues activation of the analysis modules 204c and 204d of the group 3. In this way, even if a plurality of pieces of PDF print data is transmitted from the mobile terminal after one inquiry, analysis of the print data can be initiated promptly.

However, in a modified example, the analysis module of the group 1 can be re-activated after printing of the print data. This configuration enables prompt initiation of printing of LIPS print data in a case where the printing apparatus frequently receives LIPS print data.

Further, in another modified example, a group of analysis module(s) that is to be activated after printing of the print data is settable by an instruction from an operator such as a user or an administrator. In this way, the processing of switching the analysis module can be customized according to the user environment to make the printing apparatus more convenient.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-044985, filed Mar. 8, 2016, which is hereby incorporated by reference herein in its entirety.

What is claimed is:

1. A printing apparatus comprising:
a control unit configured to control activation of a plurality of analysis units, the plurality of analysis units including at least a first analysis unit supporting a first page description language (PDL) and a second analysis unit supporting a second PDL different from the first PDL;
a reception unit configured to receive from an external apparatus a predetermined inquiry before receiving PDL data from the external apparatus; and
a transfer unit configured to transfer, to the external apparatus, a response to the predetermined inquiry, the response including at least information indicating a PDL type supported by an analysis unit included in the printing apparatus,
wherein the control unit is further configured to control at least suspension of one of the plurality of analysis units, based on the reception of the predetermined inquiry or the transmission of the response, before an analysis of the PDL data from the external apparatus is started, so that one of the plurality of analysis units is in a suspended state and so as to activate that one of the plurality of analysis units that supports the predetermined PDL type indicated by the information included in the response is in an activated state, and
wherein the control unit, the reception unit, and the transfer unit are implemented by one or more processors.

2. The printing apparatus according to claim 1, wherein the response further includes information indicating a print setting which is settable with respect to the PDL data.

3. The printing apparatus according to claim 1, wherein, upon the predetermined inquiry, the control unit activates the one of the plurality of analysis units that supports the predetermined PDL type indicated by the information after terminating the activation of another activated analysis unit.

4. The printing apparatus according to claim 3, further comprising a memory,
wherein, during an activation of an analysis unit, the control unit allocates on the memory a memory area of a predetermined size corresponding to the analysis unit, and
wherein the control unit deallocates the memory area when the control unit terminates the activation of the analysis unit.

5. The printing apparatus according to claim 1, wherein the control unit determines whether the activated analysis unit supports a PDL type of the PDL data received from the external apparatus after the predetermined inquiry, and
wherein, based on the determination, the control unit causes the activated analysis unit to analyze the received PDL data.

6. The printing apparatus according to claim 1, wherein the control unit analyzes the PDL data received from the external apparatus to determine a PDL type of the PDL data, and initiates activation of the one of the plurality of analysis units that supports the determined PDL type.

7. The printing apparatus according to claim 6, wherein, in a case where a predetermined print driver is installed in the external apparatus, the control unit analyzes the PDL data received from the external apparatus to determine the PDL type of the PDL data without receiving a predetermined inquiry in advance from the external apparatus, and initiates activation of the one of the plurality of analysis units that supports the determined PDL type.

8. The printing apparatus according to claim 1, wherein the control unit determines whether data received from the external apparatus is the predetermined inquiry, and, based on the determination, the control unit initiates activation of the one of the plurality of analysis units that supports the predetermined PDL type indicated by the information before receiving the PDL data.

9. The printing apparatus according to claim 1, wherein the control unit determines whether one of the plurality of analysis units that the control unit is to initiate activation is being activated, and
wherein, based on the determination, the control unit initiates activation of the analysis unit.

10. The printing apparatus according to claim 1, wherein the control unit initiates activation of the one of the plurality of analysis units that supports the predetermined PDL type indicated by the information, in a case where the predetermined inquiry has been received or the transfer unit has transferred a response to the external apparatus.

11. The printing apparatus according to claim 1, wherein the predetermined inquiry is an inquiry about capability of the printing apparatus according to a specific communication protocol.

12. The printing apparatus according to claim 1, wherein, after the one of the plurality of analysis units that supports the predetermined PDL type indicated by the information ends analysis of the PDL data, the control unit terminates the activation of the analysis unit and then initiates activation of a predetermined analysis unit.

13. The printing apparatus according to claim 1, wherein the control unit activates the one of the plurality of analysis units that is not being activated and supports the predetermined PDL type indicated by the information included in the response, regardless of a PDL type of the received print data.

14. The printing apparatus according to claim 1, wherein the control unit is configured to identify a PDL type of print data received from an external apparatus and control activation of the plurality of analysis units based on the identified PDL type,
wherein the control unit is further configured to be able to activate, based on the reception of the predetermined inquiry, the one of the plurality of analysis units that is not being activated and supports the predetermined PDL type indicated by the information included in the response, without identifying the PDL type.

15. The printing apparatus according to claim 1, wherein the control unit is further configured to be able to activate, based on the reception of the predetermined inquiry, only a part of the plurality of analysis units, the part including the analysis unit that is not being activated and supports the predetermined PDL type indicated by the information included in the response.

16. The printing apparatus according to claim 1, wherein the predetermined inquiry received from the external apparatus does not include the print data and information specifying any PDL type.

17. A printing method executed by a printing apparatus which has a plurality of analysis units including at least a first analysis unit supporting a first page description language (PDL) and a second analysis unit supporting a second PDL different from the first PDL, the method comprising:
receiving from an external apparatus a predetermined inquiry before receiving PDL data from an external apparatus;
transferring, to the external apparatus, a response to the predetermined inquiry, the response including at least information indicating a PDL type supported by an analysis unit included in the printing apparatus; and
based on the reception of the predetermined inquiry or the transmission of the response, before an analysis of the PDL data from the external apparatus is started, controlling at least suspension of one of the plurality of analysis units, so that one of the plurality of analysis units is in suspended state and so that one of the plurality of analysis units that supports the PDL type indicated by the information included in the response is in an activated state;
receiving, from the external apparatus, the PDL data; and
analyzing the received PDL data using the analysis unit which has been activated before the print data is received.

18. The printing method according to claim 17, wherein the predetermined inquiry received from the external apparatus does not include the print data and information specifying any PDL type.

* * * * *